United States Patent
Bailey et al.

(10) Patent No.: US 10,775,987 B2
(45) Date of Patent: Sep. 15, 2020

(54) PROCESSING A SEQUENCE OF OPERATIONS USING OPERATION TRACKING SCREENS

(71) Applicant: salesforce.com, inc., San Francisco, CA (US)

(72) Inventors: Samuel William Bailey, Cardiff (GB); Jason Teller, San Francisco, CA (US); Nathan Edward Lipke, Denver, CO (US); Anvitha Jaishankar, San Francisco, CA (US); James Johnson, San Francisco, CA (US); Yucheng Wang, San Mateo, CA (US); Hugh Cockburn, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 101 days.

(21) Appl. No.: 16/036,063

(22) Filed: Jul. 16, 2018

(65) Prior Publication Data
US 2020/0019300 A1 Jan. 16, 2020

(51) Int. Cl.
*G06F 3/0484* (2013.01)
*G06F 9/451* (2018.01)
*G06F 3/0483* (2013.01)
*G06F 3/01* (2006.01)
*G06F 16/904* (2019.01)

(52) U.S. Cl.
CPC .......... *G06F 3/04847* (2013.01); *G06F 3/017* (2013.01); *G06F 3/0483* (2013.01); *G06F 9/451* (2018.02); *G06F 16/904* (2019.01)

(58) Field of Classification Search
CPC ...................................................... G06F 17/00
See application file for complete search history.

(56) References Cited

U.S. PATENT DOCUMENTS

| | | | |
|---|---|---|---|
| 6,826,727 B1 * | 11/2004 | Mohr et al. | G06F 17/21 |
| 8,862,975 B2 | 10/2014 | Liao | |
| 9,792,079 B2 | 10/2017 | Smyth | |
| 2008/0036784 A1 * | 2/2008 | Behar et al. | G09G 5/02 |
| 2008/0243567 A1 * | 10/2008 | Morrision et al. | G06F 9/44 |
| 2012/0096384 A1 * | 4/2012 | Albert et al. | G06F 17/30 |
| 2013/0173324 A1 | 7/2013 | Lo | |
| 2014/0164961 A1 | 6/2014 | Louie | |
| 2014/0324514 A1 | 10/2014 | Lo | |

(Continued)

*Primary Examiner* — James J Debrow
(74) *Attorney, Agent, or Firm* — Butzel Long

(57) ABSTRACT

A processor can cause operation tracking screens to be presented on a display. The operation tracking screens can include first and second screen areas. Some of the first screen areas can have graphical control elements configured to receive information associated with actions associated with a sequence of operations. The actions can include first and second actions performed concurrently. The second screen areas can have a graphical representation of stages of the sequence of operations. The graphical representation of the stages can be of a default sequence of the stages, in response to an initiation of the sequence of operations, and can be modified to include a graphical representation of an additional stage in response to a determination of a result of a condition being a specific value. The processor can receive signals associated with the information associated with the actions and can cause the sequence of operations to be processed.

20 Claims, 11 Drawing Sheets

(56) References Cited

U.S. PATENT DOCUMENTS

| | | |
|---|---|---|
| 2015/0026573 A1* | 1/2015 | Meng .................... G06F 3/0484 |
| 2015/0199180 A1 | 7/2015 | Louie |
| 2016/0201446 A1 | 7/2016 | Anghelescu |
| 2016/0239487 A1* | 8/2016 | Potharaju et al. ...... G06F 17/30 |
| 2016/0320957 A1 | 11/2016 | Louie |
| 2016/0350079 A1 | 12/2016 | Louie |
| 2017/0147190 A1 | 5/2017 | Twist |
| 2017/0147290 A1 | 5/2017 | Kumar |
| 2017/0364843 A1 | 12/2017 | Haligowski |

* cited by examiner

900

902
Receive a first signal to initiate a production of an application to process a sequence of operations 904
Cause, in response to a receipt of the first signal, an operation tracking design screen to be presented on a display 906
Receive second signals that indicate:
Selections of a set of graphical control elements associated with actions associated with the sequence of operations and
Directions, with respect to a set of graphical representations, among the actions 908
Cause, in response to receipts of the second signals, a set of operation tracking screens to be produced

1002 — Cause a graphical representation, of a set of second graphical representations, to appear in a first screen area at a location of a first graphical representation of a set of first graphical representations 1004 — Cause a pointing device gesture to occur to move the graphical representation to appear in the first screen area at a location of a second graphical representation of the set of first graphical representations

1102 — Receive a first signal to initiate an application to process a sequence of operations

1104 — Cause, in response to a receipt of the first signal, an operation tracking screens to be presented on a display

1106 — Receive second signals associated with information associated with actions associated with the sequence of operations

1108 — Cause, in response to receipts of the second signals, the sequence of operations to be processed

FIG. 11

PROCESSING A SEQUENCE OF OPERATIONS USING OPERATION TRACKING SCREENS

BACKGROUND

An application to process a sequence of operations can be executed on a processor. The processor can cause operation tracking screens to be presented on a display. At least some of the operation tracking screens can include first screen areas and second screen areas. At least some of the first screen areas can have graphical control elements configured to receive information associated with actions associated with the sequence of operations. The second screen areas can have a graphical representation of stages of the sequence of operations. The processor can receive signals associated with the information associated with the actions associated with the sequence of operations. The processor can cause, in response to the signals, the sequence of operations to be processed.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

FIG. 9 is a flow diagram illustrating an example of a method for producing an application to process a sequence of operations according to the disclosed technologies.

FIG. 10 is a flow diagram illustrating an example of a method for causing the set of second graphical representations to appear in the first screen area according to the disclosed technologies.

FIG. 11 is a flow diagram illustrating an example of a method for processing a sequence of operations according to the disclosed technologies.

DETAILED DESCRIPTION

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

Figure 1:
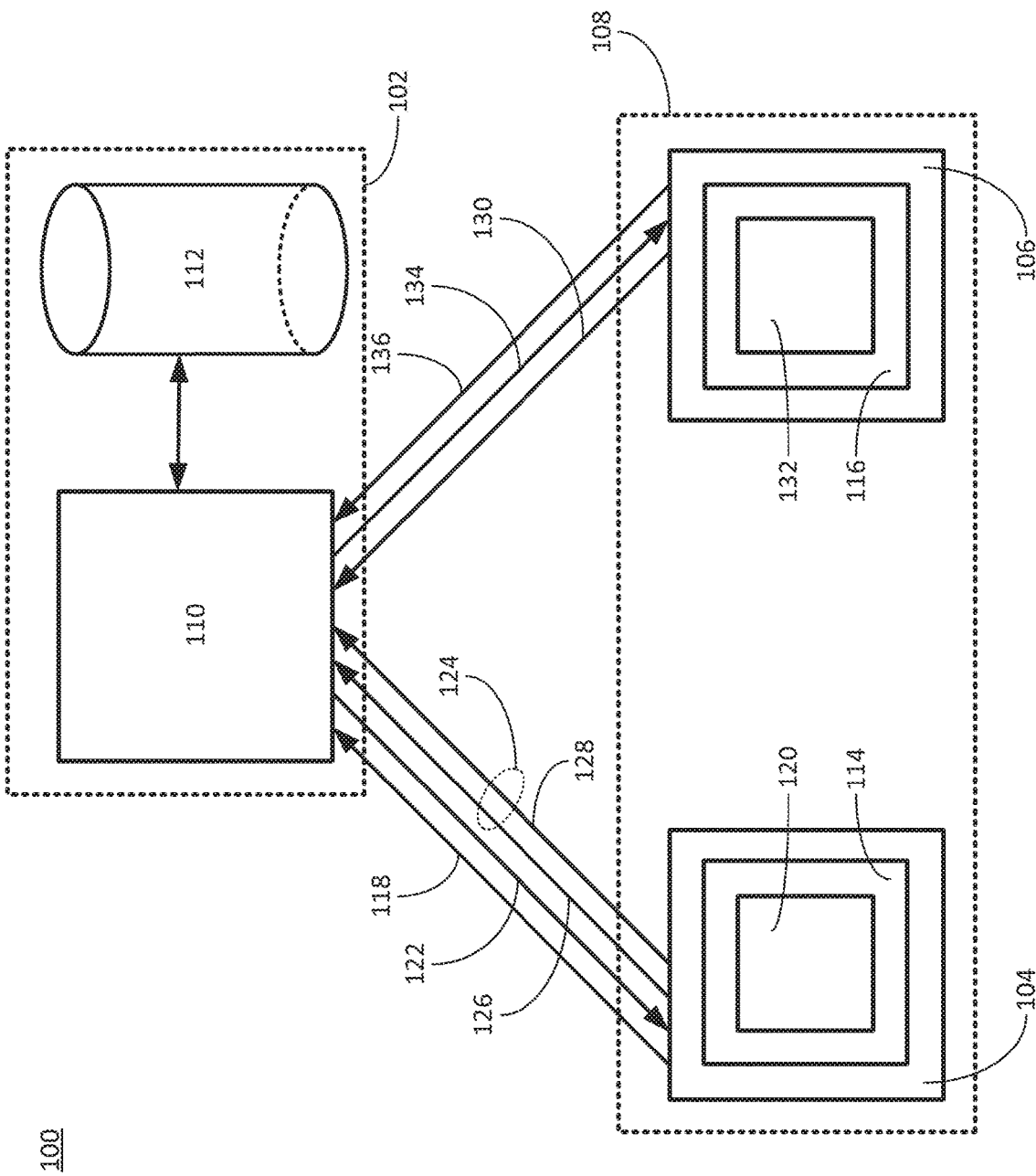
FIG. 1 is a diagram illustrating an example of an environment for a system for producing an application to process a sequence of operations and for processing the sequence of operations according to the disclosed technologies.

FIG. 1 is a diagram illustrating an example of an environment 100 for a system 102 for producing an application to process a sequence of operations and for processing the sequence of operations according to the disclosed technologies. The environment 100 can include, for example, the system 102, a first user device 104, and a second user device 106. Alternatively, a function of the second user device 106 and a function of the first user device 104 can be incorporated into a user device 108. The system 102 can include, for example, a processor 110 and a database 112. The first user device 104 can include, for example, a first display 114. The second user device 106 can include, for example, a second display 116.

The processor 110 can be configured to receive a first signal 118 to initiate a production of a first application to process a first sequence of operations. For example, the processor 110 can receive the first signal 118 from the first user device 104.

Figure 2:
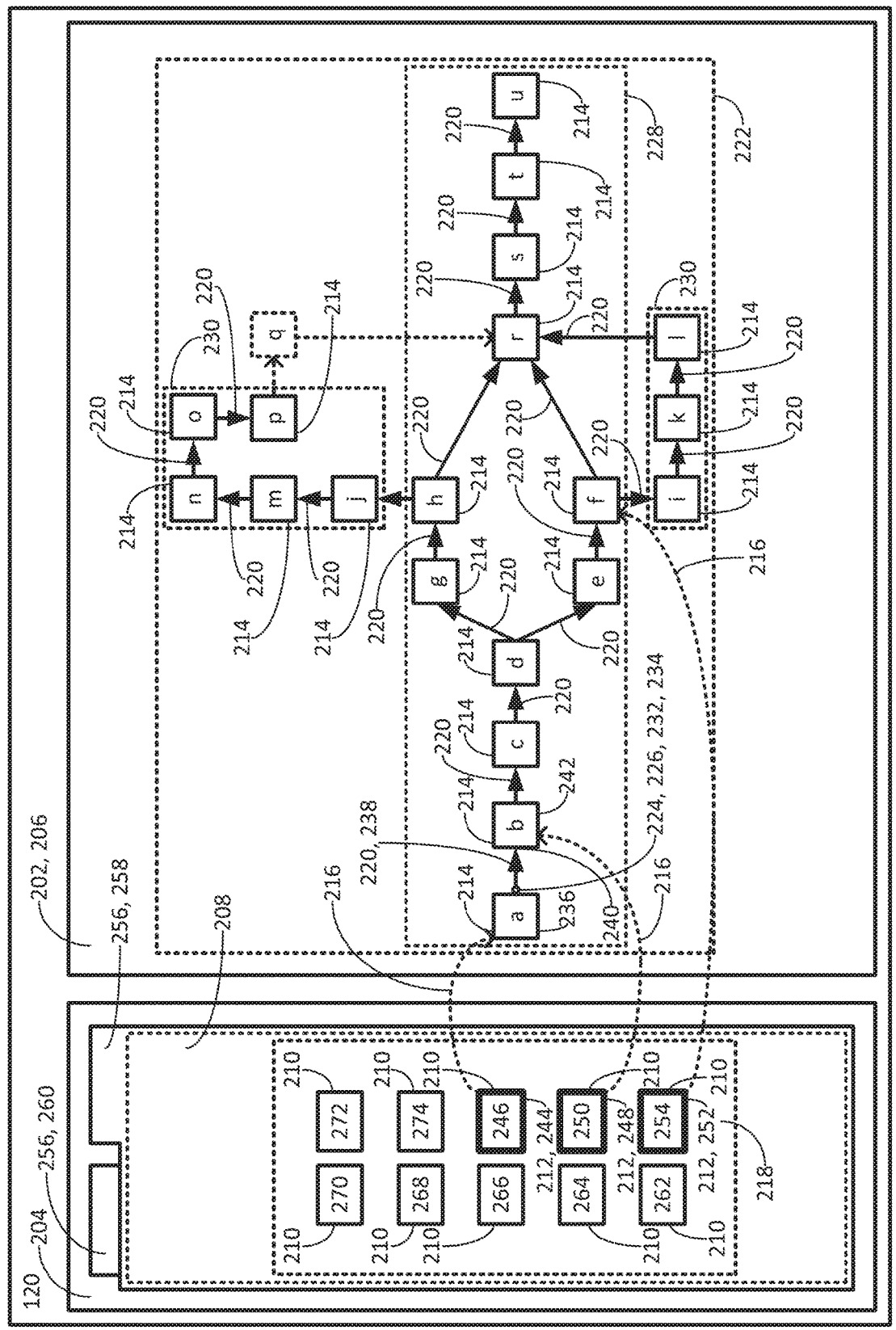
FIG. 2 is a diagram illustrating an example of the operation tracking design screen according to the disclosed technologies.

The processor 110 can be configured to cause, in response to a receipt of the first signal 118, an operation tracking design screen 120 to be presented 122 on the first display 114. FIG. 2 is a diagram illustrating an example of the operation tracking design screen 120 according to the disclosed technologies. The operation tracking design screen 120 can include, for example, a first screen area 202 and a second screen area 204. The first screen area 202 can be a canvas graphical user interface 206. The second screen area 204 can include a population 208 of first graphical control elements 210 configured to cause, in response to being selected 212, first graphical representations 214 to appear 216 in the first screen area 202.

With reference to FIGS. 1 and 2, the processor 110 can be configured to receive second signals 124. For example, the processor 110 can receive the second signals 124 from the first user device 104. The second signals 124 can indicate selections 212, from the population 208, of a set 218 of first graphical control elements 210. (In FIG. 2, for illustrative purposes described below, all eight first graphical control elements 210 included in the population 208 are also included in the set 210. For simplicity, only three selections 212 are illustrated.) The set 218 of first graphical control elements 210 can be associated with actions associated with the first sequence of operations. The second signals 124 can also indicate directions 220, with respect to a set 222 of first graphical representations 214, among the actions associated with the first sequence of operations.

The processor 110 can be configured to cause, in response to receipts of the second signals 124, a first set of operation tracking screens to be produced. At least some of the operation tracking screens can include, for example, third screen areas and fourth screen areas. At least some of the third screen areas can have second graphic control elements configured to receive an information associated with the actions associated with the first sequence of operations. The actions can include, for example, a first action performed concurrently with a second action. The fourth screen areas can have a graphical representation of stages of the first sequence of operations. The graphical representation of the stages can be of a default sequence of the stages in response to an initiation of the first application to process the first sequence of operations. The graphical representation of the stages can be modified to include a graphical representation of an additional stage in response to a determination of a result of a specific condition being a specific value.

Figure 3:
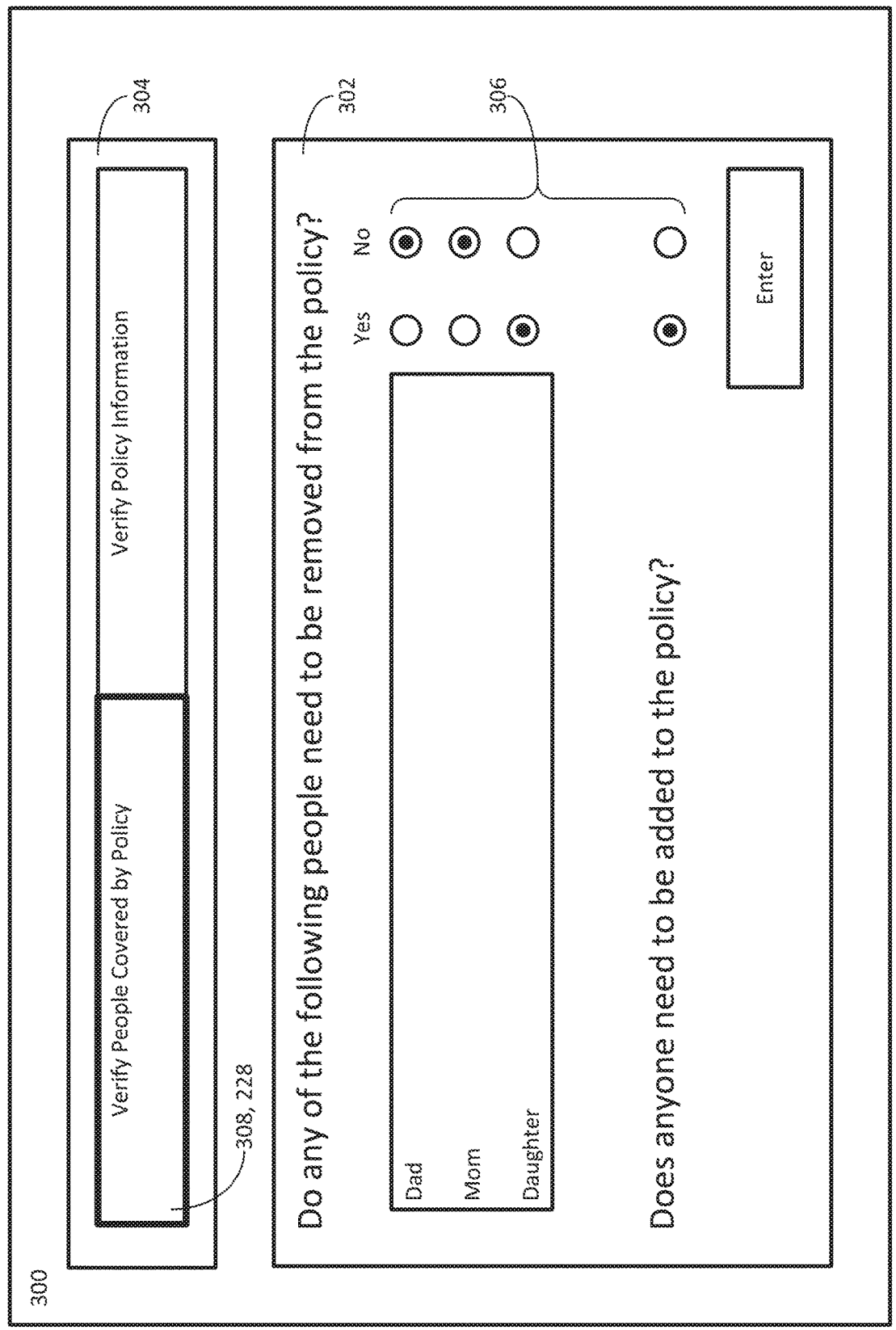
FIG. 3 is a diagram illustrating an example of an operation tracking screen according to the disclosed technologies.

FIG. 3 is a diagram illustrating an example of an operation tracking screen 300 according to the disclosed technologies. The operating tracking screen 300 can include, for example, a third screen area 302 and a fourth screen area 304. The third screen area 302 can have the second graphical control elements 306 configured to receive the information associated with the actions associated with the first sequence of operations. The graphical control elements 306 can include, for example, one or more of a button, a radio button, a check box, a split button, a cycle button, a slider, a list box, a spinner, a drop-down list, a menu, a context menu, a pie menu, a menu bar, a tool bar, a ribbon, a combo box, a text box, or the like. The fourth screen area 304 can have the graphical representation 308 of the stages of the first sequence of operations.

With reference to FIGS. 1 and 2, in a configuration, the second signals 124 can include, for example, first second signals 126 and second signals 128. The first second signals 126 can indicate the selections 212 of the set 218 of first graphical control elements 210. The second signals 128 can indicate the directions 220, with respect to the set 222 of first graphical representations 214, among the actions associated with the first sequence of operations. The processor 110 can be configured to cause the first set of operation tracking screens to be produced by: (1) causing, in response to receipts of the first second signals 126, the set 222 of first graphical representations 214, associated with the set 218 of first graphical control elements 210, to appear 216 in the first screen area 202 and (2) causing, in response to receipts of the second signals 128, a set 224 of second graphical representations 226 to appear in the first screen area 202. The set 224 of second graphical representations 226 can indicate the directions 220, with respect to the set 222 of first graphical representations 214, among the actions associated with the first sequence of operations. (In FIG. 2, twenty-one directions 220 are illustrated. For simplicity, only one of the twenty-one directions 220 is illustrated to be a graphical representation 226 of the set 224.) In conjunction with a selection 212 of a first graphical control element 210, a determination can be made whether the first graphical control element 210 is associated with an action in a stage in a default sequence of the stages 228 or whether the first graphical control element 210 is associated with an action in an additional stage 230.

In a configuration, the processor 110 can be configured to cause the set 224 of second graphical representations 226 to appear in the first screen area 202 by: (1) causing a graphical representation 232, of the set 224 of second graphical representations 226, to appear in the first screen area 202 at a location 234 of a first graphical representation 236 of the set 222 of first graphical representations 214 and (2) causing a pointing device gesture 238 to occur to move the graphical representation 232 to appear in the first screen area 202 at a location 240 of a second graphical representation 242 of the set 222 of first graphical representations 214 (e.g., a drag and drop pointing device gesture). (In FIG. 2, twenty-one directions 220 are illustrated. For simplicity, only one of the twenty-one directions 220 is illustrated to be a graphical representation 226 of the set 224. This is the graphical representation 232. For simplicity, only one first graphical representation 236, only one second graphical representation 242, and only one pointing device gesture 238 from the location 234 to the location 240 are illustrated.)

In a configuration, the actions associated with the first sequence of operations can further include, for example, third actions causing the stages of the first sequence of operations to be defined, fourth actions causing the operation tracking screens to be presented on the second display 116, and a fifth action being determining the result of the specific condition. In a configuration, the second display 116 can be the first display 114. For example, the function of the second user device 106 and the function of the first user device 104 can be incorporated into the user device 108.

In a configurations, the second signals 124 can indicate first selections 244 of a first type 246 of the first graphical control elements 210. The first type 246 can be associated with an action to change a value of a specific variable. The specific variable can be referenceable by another action. The second signals 124 can select the specific variable to be a stage. The stage can be of the first sequence of operations. The second signals 124 can set the value to be a name of the stage. The second signals 124 can indicate second selections 248 of a second type 250 of the first graphical control elements 210. The second type 250 can be associated with an action to present an operation tracking screen. The second signals 124 can indicate a third selection 252 of a third type 254 of the first graphical control elements 210. The third type 254 can be associated with an action to determine a result of a condition. The second signals 124 can set the condition to be the specific condition.

Figure 4:
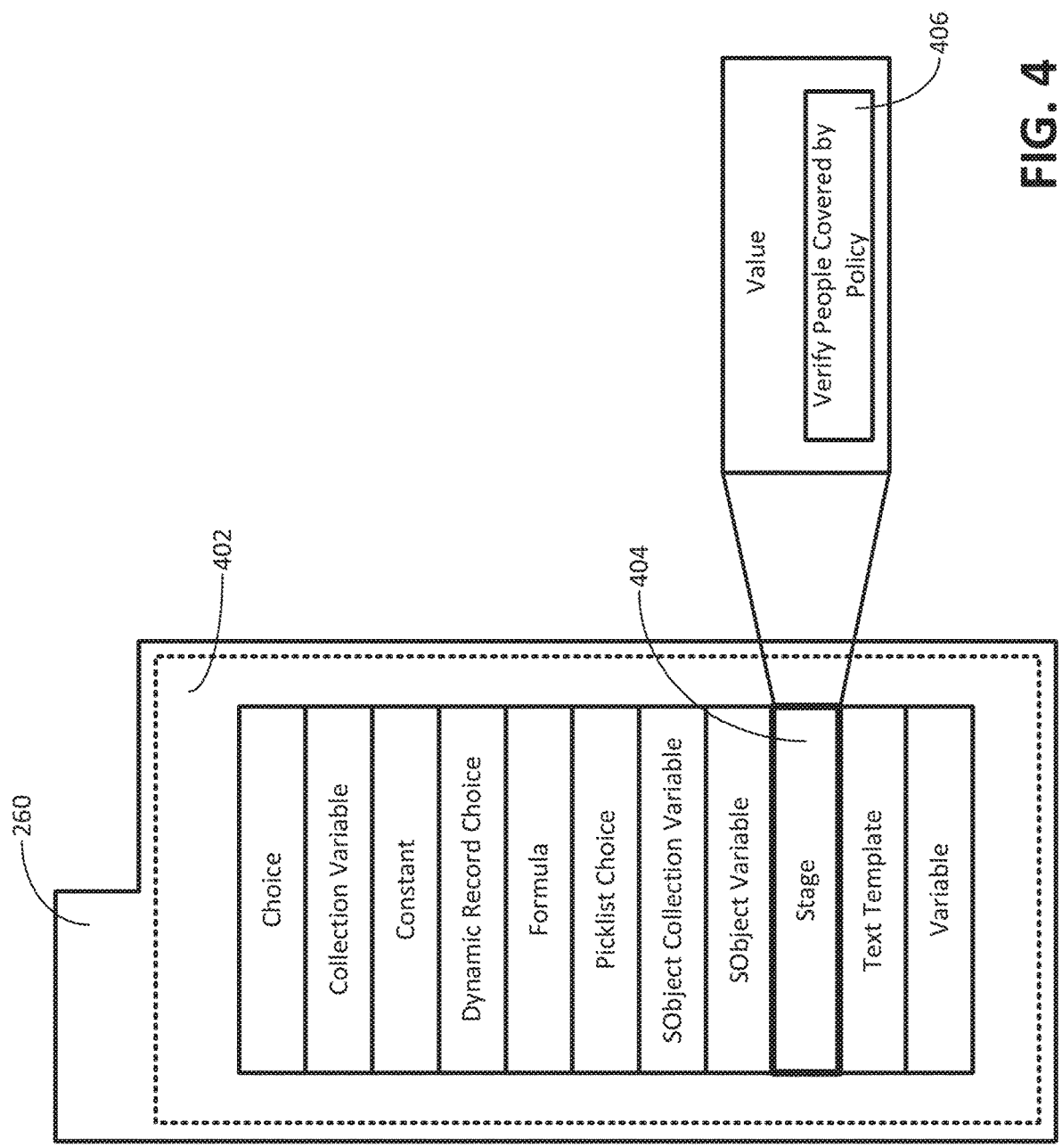
FIG. 4 is a diagram illustrating an example of the second tab according to the disclosed technologies.

In a configuration, the set 218 of first graphical control elements 210 can include the first type 246. In a configuration, the second screen area 204 can include a tab interface 256. The tab interface 256 can include, for example, a first tab 258 and a second tab 260. The first tab 258 can include the population 208 of first graphical control elements 210. FIG. 4 is a diagram illustrating an example of the second tab 260 according to the disclosed technologies. The second tab 260 can include a set of variables 402. The set of variables 402 can be referenceable by other actions. The second signals 124 can select, from the set of variables 402, the specific variable 404. The second signals 124 can set the value 406 of the specific variable 404.

With reference to FIGS. 1 and 2, in a configuration, the set 218 of first graphical control elements 210 can include a fourth type 262 of the first graphical control elements 210 associated with a fourth action to initiate a second application to process a second sequence of operations. The second sequence of operations can be associated with a second set of operation tracking screens (not illustrated). The actions associated with the second sequence of operations can include an action to interface with the database 112 (i.e., the same database with which the first sequence of operations can interact).

In a configuration, the actions associated with the first sequence of operations can further include, for example, one or more of a fifth action causing a value to be read from the database 112, a sixth action causing a value to be written to the database 112, a seventh action causing a record to be created in the database 112, an eighth action causing a record to be deleted from the database 112, the third action determining a result of a condition, a ninth action causing one or more specific actions to be performed, in an iterative manner, on each item in a set of items, or a tenth action causing processing of at least a portion of the first sequence of operations to pause until a specific event occurs. In a configuration, the set 218 of first graphical control elements 210 can include, for example, one or more of a fifth type 264 of the first graphical control elements 210 associated with the fifth action, a sixth type 266 of the first graphical control elements 210 associated with the sixth action, a seventh type 268 of the first graphical control elements 210 associated with the seventh action, an eighth type 270 of the first graphical control elements 210 associated with the eighth action, the third type 254 of the first graphical control elements 210 associated with the third action, a ninth type 272 of the first graphical control elements 210 associated with the ninth action, or a tenth type 274 of the first graphical control elements 210 associated with the tenth action.

Returning to FIG. 1, the processor 110 can be configured to receive a third signal 130 to initiate the first application to process the first sequence of operations. For example, the processor 110 can receive the third signal 130 from the second user device 106. In a configuration, the second user device 106 can be the first user device 104. For example, the function of the second user device 106 and the function of the first user device 104 can be incorporated into the user device 108.

The processor 110 can be configured to cause, in response to a receipt of the third signal 130, an operation tracking screen 132, of the first set of operation tracking screens, to be presented 134 on the second display 116. For example, the operation tracking screen 132 illustrated in FIG. 1 can be the operation tracking screen 300 illustrated in FIG. 3.

Returning to FIG. 1, the processor 110 can be configured to receive fourth signals 136 associated with the information associated with the actions associated with the first sequence of operations. For example, with reference to FIG. 3, the information associated with the actions associated with the first sequence of operations can be received by the second graphical control elements 306.

Returning to FIG. 1, the processor 110 can be configured to cause, in response to receipts of the fourth signals 136, the first sequence of operations to be processed.

In a configuration, the processor 110 can be configured to receive one or more of the fourth signals 136 associated with the information as a free-form text. The processor 110 can be configured to cause the first sequence of operations to be processed by at least producing, through a word embedding process, a vector that represents one or more words of the free-form text. Alternatively or additionally, another artificial intelligence technique can be used to convert the free-form text into information that can be processed in the first sequence of operations.

For illustrative purposes herein, the first sequence of operations can be for a verification of information for a policy for car insurance for a family. In the example, the family can be the Browns: Dad, Mom, Daughter, and Grandma. In the example, the policy previously covered Dad, Mom, and Daughter, but, at the time of the verification, Daughter can be removed from the policy and Grandma can be added to the policy.

With reference to FIGS. 1 and 2, the processor 110 can receive, from the first user device 104, the first signal 118 to initiate the production of the first application to process the first sequence of operations. The processor 110 can cause, in response to the receipt of the first signal 118, the operation tracking design screen 120 to be presented 122 on the first display 114. The processor 110 can receive, from the first user device 104, the second signals 124. The second signals 124 can indicate the selections 212, from the population 208, of the set 218 of first graphical control elements 210.

The selections 212 can include: (1) four selections 212 of the first type 246 of the first graphical control elements 210 to cause the first graphical representations 214 for defining a first stage (a), a second stage (i), a third stage (j), and a fourth stage (s); (2) five selections 212 of the second type 250 of the first graphical control elements 210 to cause the first graphical representations 214 for a first operation tracking screen (a), a second operation tracking screen (d), a third operation tracking screen (k), a fourth operation tracking screen (n), and a fifth operation tracking screen (u); (3) two selections 212 of the third type 254 of the first graphical control elements 210 to cause the first graphical representations 214 for a first determination of a result of a condition (f) and a second determination of a result of a condition (h); (4) a selection of the fourth type 262 of the first graphical control elements 210 to cause the first graphical representation 214 for an initiation of a second application to process a second sequence of operations; (5) two selections of the fifth type 264 of the first graphical control elements 210 to cause the first graphical representations 214 for one or more first values to be read from the database 112 (c) and one or more second values to be read from the database 112 (t); (6) a selection of the sixth type 266 of the first graphical control elements 210 to cause the first graphical representation 214 for one or more third values to be written to the database 112 (o); (7) a selection of the seventh type 268 of the first graphical control elements 210 to cause the first graphical representation 214 for one or more records to be created in the database 112 (m); (8) a selection of the eighth type 270 of the first graphical control elements 210 to cause the first graphical representation 214 for one or more records to be deleted from the database 112 (l); (9) two selections of the ninth type 272 of the first graphical control elements 210 to cause the first graphical representations 214 for a first one or more specific actions to be performed, in an iterative manner, on each item in a first set of items (e) and a second one or more specific actions to be performed, in an iterative manner, on each item in a second set of items (g); and (10) a selection of the tenth type 274 of the first graphical control elements 210 to cause the first graphical representation 214 for causing processing of at least a portion of the first sequence of operations to pause until a specific event occurs (r).

The second signals 124 can also indicate the directions 220, with respect to the set 222 of first graphical representations 214, among the actions associated with the first sequence of operations as illustrated in FIG. 2. The processor 110 can cause, in response to the receipts of the second signals 124, the first set of operation tracking screens to be produced.

The processor can receive, from the second user device 106, the third signal 130 to initiate the first application to process the first sequence of operations. In response to an initiation of the first application, an action associated with the first graphical representations 214 (a) defines the first stage (Verify People Covered by Policy). The processor 110 can cause, in response to the receipt of the third signal 130, the first set of operation tracking screens to be presented 134 on the second display 116 as an action associated with the first graphical representations 214 (b).

Figure 5:
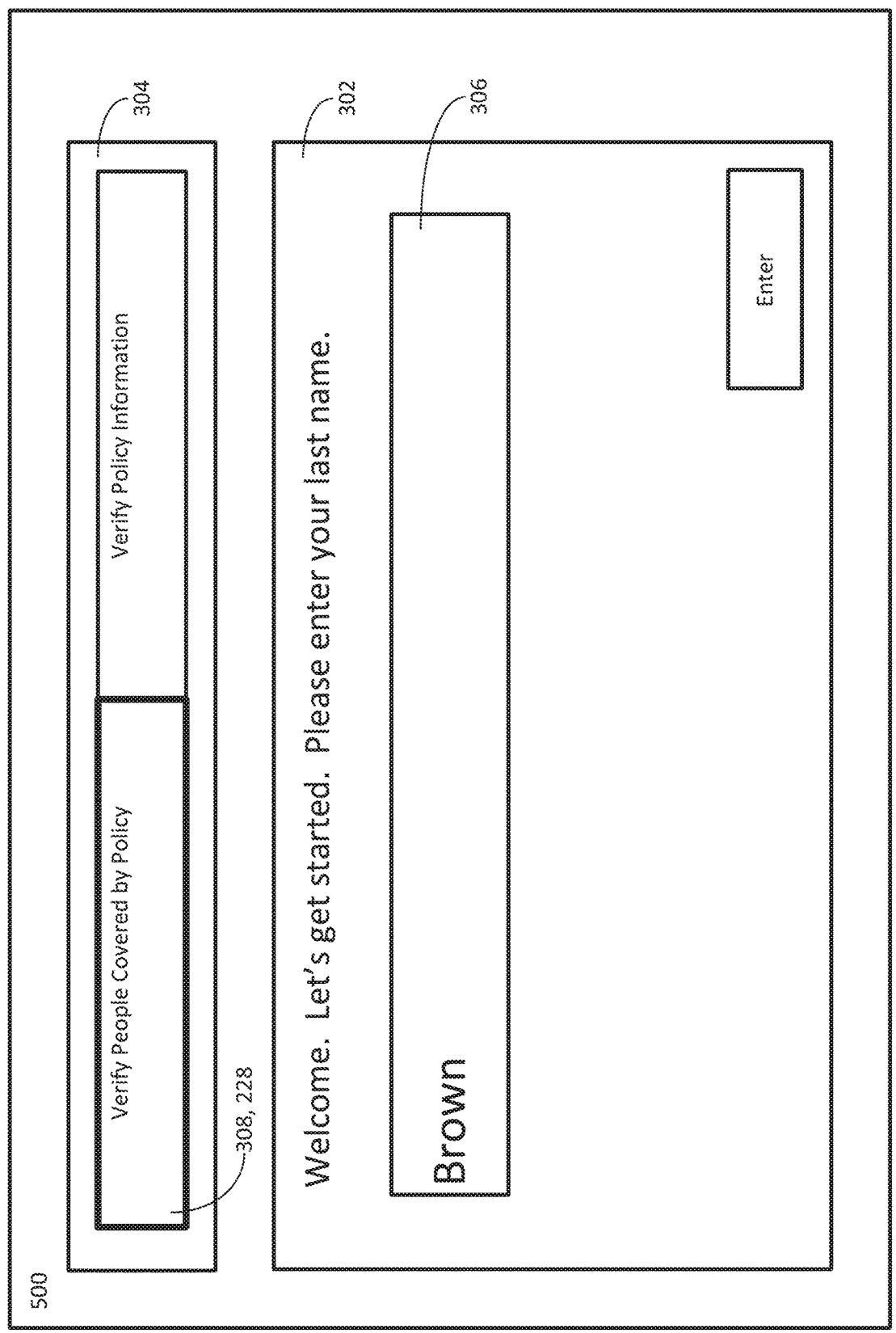
FIG. 5 is a diagram illustrating an example of the first operation tracking screen according to the disclosed technologies.

FIG. 5 is a diagram illustrating an example of the first operation tracking screen 500 according to the disclosed technologies. The first operation tracking screen 500 can include the third screen area 302 and the fourth screen area 304. The third screen area 302 can have the second graphical control elements 306 configured to receive the information associated with the actions associated with the first sequence of operations. The graphical control elements 306 can include, for example, a text box. The fourth screen area 304 can have the graphical representation 308 of the stages of the first sequence of operations. The graphical representation 308 can be of the default sequence of the stages 228. In a configuration, a portion of the graphical representation 308 associated with the first stage (Verify People Covered by Policy) can be highlighted.

With reference to FIG. 1, the processor 110 can receive the fourth signals 136 associated with the information associated with the actions associated with the first sequence of operations. For example, with reference to FIG. 5, the information associated with the actions associated with the first sequence of operations (Brown) can be received by the second graphical control elements 306 (the text box).

With reference to FIG. 1, the processor 110 can cause, in response to the receipts of the fourth signals 136, the first sequence of operations to be processed.

With reference to FIGS. 1 and 2, an action associated with the first graphical representations 214 (*c*) reads, from the database 112, the names of the people currently identified as covered by the policy (Dad, Mom, Daughter). An action associated with the first graphical representations 214 (*d*) presents the second operation tracking screen. The operation tracking screen 300 illustrated in FIG. 3 can be an example of the second operation tracking screen. The third screen area 302 can have the second graphical control elements 306 configured to receive the information associated with the actions associated with the first sequence of operations. The graphical control elements 306 can include, for example, a collection of radio buttons. The information associated with the actions associated with the first sequence of operations (Do any of the following people need to be removed from the policy? Dad, no; Mom, no; Daughter, yes. Does anyone need to be added to the policy? Yes) can be received by the second graphical control elements 306 (the collection of radio buttons).

With reference to FIG. 2, an action associated with the first graphical representations 214 (*e*) causes an action associated with the first graphical representations 214 (*f*), determining a result of a condition (Do any of the following people need to be removed from the policy?), to be performed, in an iterative manner, on each item in a first set of items (Dad, Mom, and Daughter). For Dad, the result of the condition is no. For Mom, the result of the condition is no. For Daughter, the result of the condition is yes. Concurrently with the action associated with the first graphical representations 214 (*e*) and the action associated with the first graphical representations 214 (*f*), an action associated with the first graphical representations 214 (*g*) causes an action associated with the first graphical representations 214 (*h*), determining a result of a condition (Does anyone need to be added to the policy?), to be performed, in an iterative manner, on each item in a second set of items. The result of the condition is yes.

In response to the result of the condition (Do any of the following people need to be removed from the policy?) being, for Daughter, yes, an action associated with the first graphical representations 214 (*i*) defines the second stage (Remove Person from Policy).

In response to the result of the condition (Does anyone need to be added to the policy?) being yes, an action associated with the first graphical representations 214 (*j*) defines the third stage (Add New Person to Policy).

Figure 6:
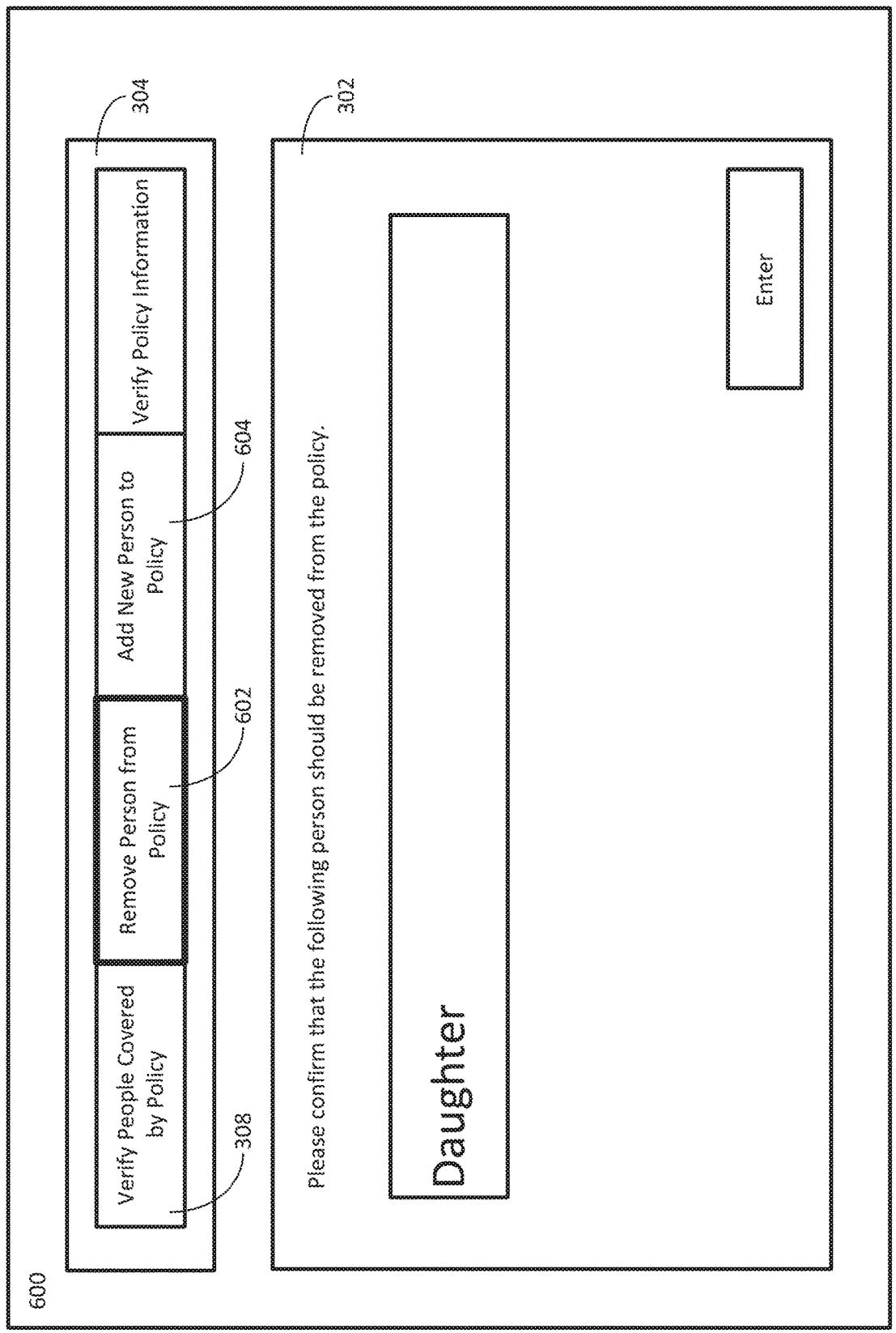
FIG. 6 is a diagram illustrating an example of the third operation tracking screen according to the disclosed technologies.

An action associated with the first graphical representations 214 (*k*) presents the third operation tracking screen. FIG. 6 is a diagram illustrating an example of the third operation tracking screen 600 according to the disclosed technologies. The third operation tracking screen 600 can include the third screen area 302 and the fourth screen area 304. The third screen area 302 can present the name (Daughter) of the person to be removed from the policy so that a confirmation can be entered. The fourth screen area 304 can have the graphical representation 308 of the stages of the first sequence of operations. However, because the second stage (Remove Person from Policy) is an additional stage 230 (i.e., outside of the default sequence of the stages 228) in response to a determination that the result of the condition (Do any of the following people need to be removed from the policy?) is, for Daughter, yes, the graphical representation 308 can be modified to include a graphical representation 602 of the second stage. Likewise, because the third stage (Add New Person to Policy) is an additional stage 230 (i.e., outside of the default sequence of the stages 228) in response to a determination that the result of the condition (Does anyone need to be added to the policy?) is yes, the graphical representation 308 can be modified can be modified to include a graphical representation 604 of the third stage. In a configuration, the graphical representation 602 associated with the second stage (Remove Person from Policy) can be highlighted.

With reference to FIGS. 1 and 2, an action associated with the first graphical representations 214 (*l*) deletes, from the database 112, the record associated with Daughter.

Figure 7:
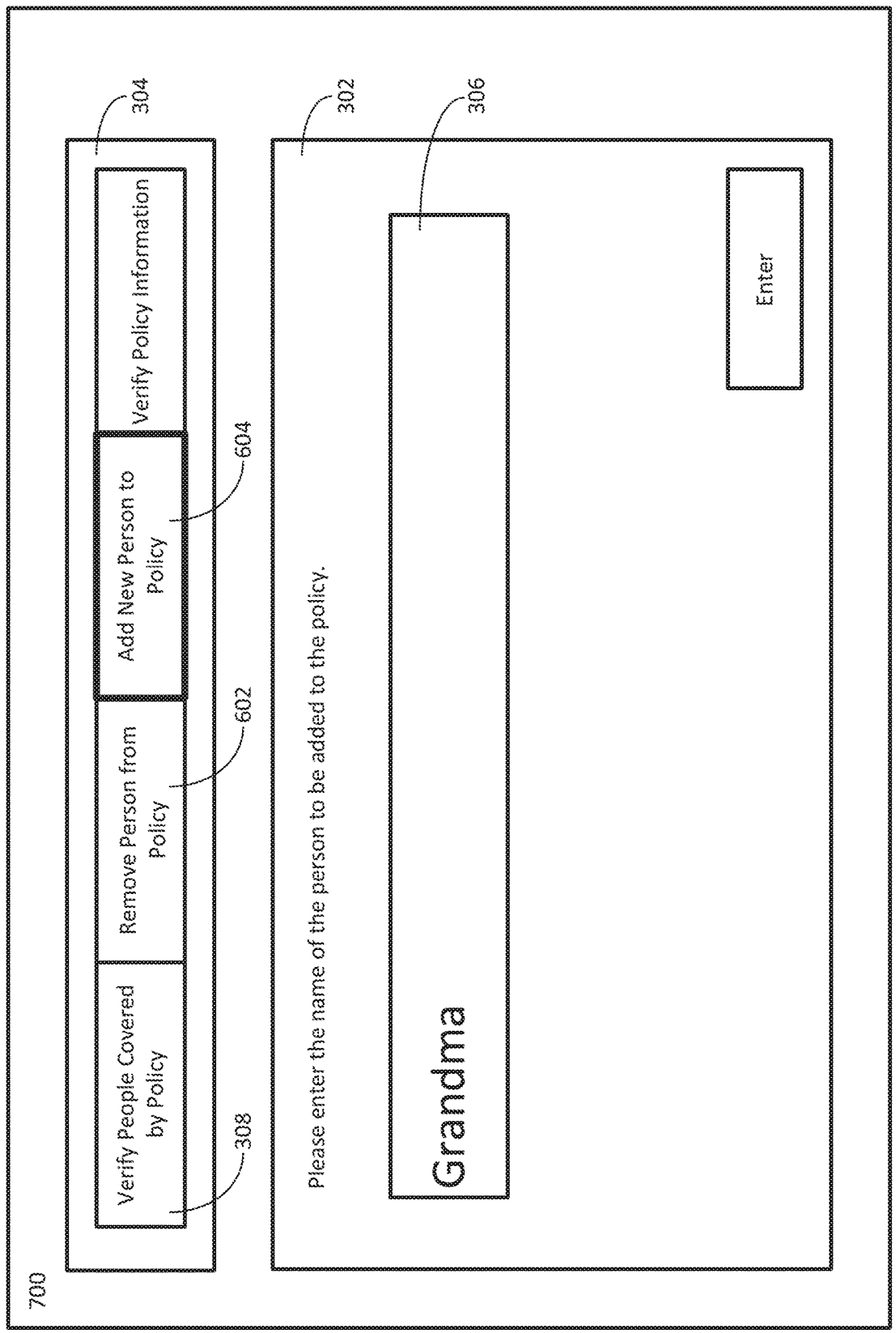
FIG. 7 is a diagram illustrating an example of the fourth operation tracking screen according to the disclosed technologies.

An action associated with the first graphical representations 214 (*m*) creates, in the database 112, a record to be associated with Grandma. An action associated with the first graphical representations 214 (*n*) presents the fourth operation tracking screen. FIG. 7 is a diagram illustrating an example of the fourth operation tracking screen 700 according to the disclosed technologies. The fourth operation tracking screen 700 can include the third screen area 302 and the fourth screen area 304. The third screen area 302 can have the second graphical control elements 306 configured to receive the information associated with the actions associated with the first sequence of operations. The graphical control elements 306 can include, for example, a text box. The information associated with the actions associated with the first sequence of operations (Grandma) can be received by the second graphical control elements 306 (the text box). The fourth screen area 304 can have the graphical representation 308 of the stages of the first sequence of operations that includes the graphical representation 602 of the second stage (Remove Person from Policy) and the graphical representation 604 of the third stage (Add New Person to Policy). In a configuration, the graphical representation 604 associated with the third stage (Add New Person to Policy) can be highlighted.

With reference to FIGS. 1 and 2, an action associated with the first graphical representations 214 (*o*) writes, to the database 112, Grandma to the record to be associated with Grandma created by the action associated with the first graphical representations 214 (*m*).

An action associated with the first graphical representations 214 (*p*) causes an initiation of a second application to process a second sequence of operations. The second sequence can be for an addition of a person to the policy. The second sequence of operations can be associated with a second set of operation tracking screens (not illustrated). The actions associated with the second sequence of operations can include an action to interface with the database 112 (i.e., the same database with which the first sequence of operations can interact). For illustrative purposes, the second sequence of operations is depicted in FIG. 2 as element (q).

An action associated with the first graphical representations 214 (*r*) causes processing of at least a portion of the first sequence of operations to pause until a specific event occurs. The specific event can be: (1) a completion of the action associated with the first graphical representations 214 (*f*), determining the result of the condition (Do any of the following people need to be removed from the policy?) for which the result of the condition is no (Dad and Mom), (2) a completion of the action associated with the first graphical representations 214 (*h*), determining the result of the condition (Does anyone need to be added to the policy?) for which the result of the condition is no, (3) a completion of the action associated with the first graphical representations 214 (*l*), deleting, from the database 112, the record associated with Daughter, and (4) a completion of the second sequence of operations (q) to add the information for Grandma to the database 112.

Figure 8:
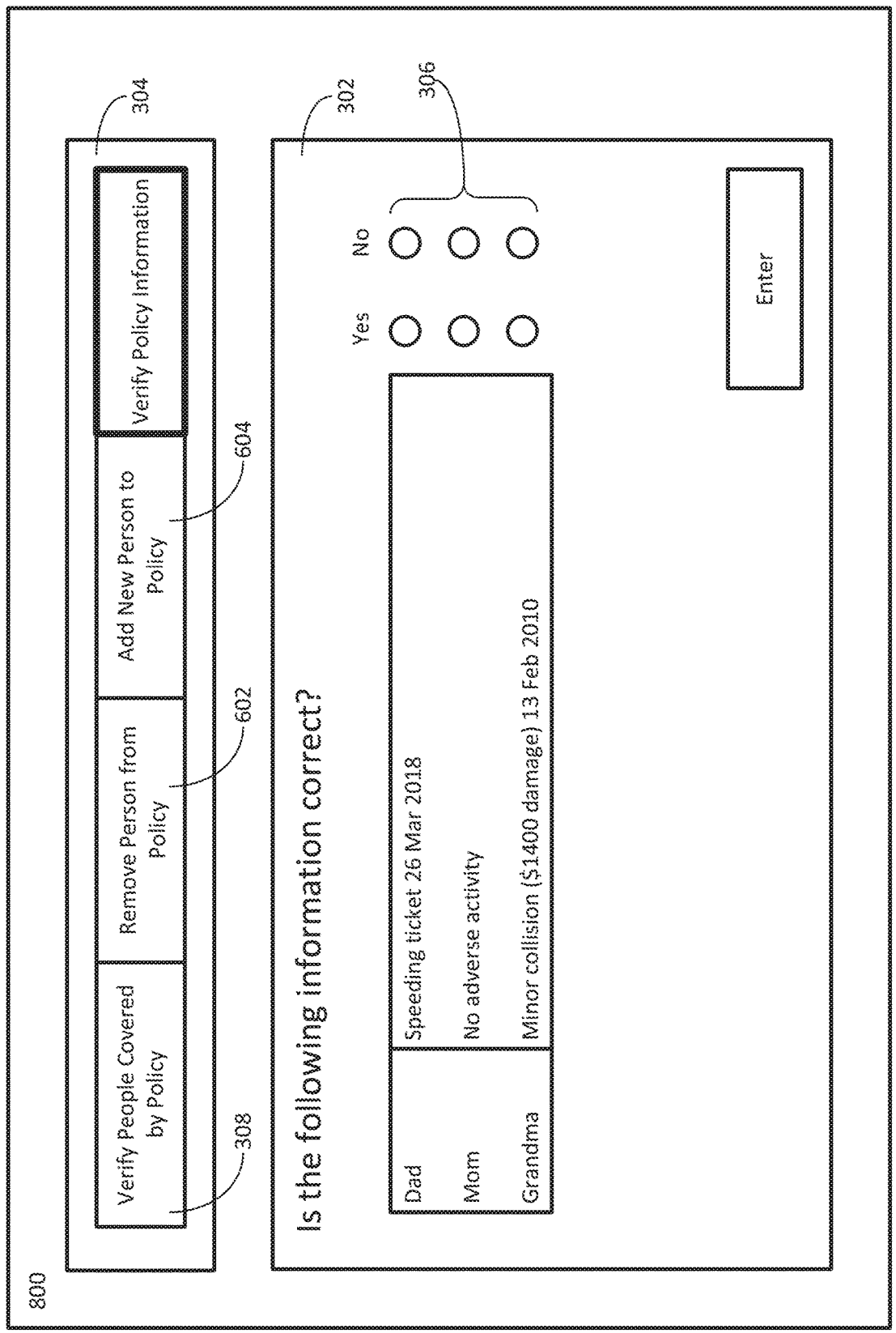
FIG. 8 is a diagram illustrating an example of the fourth operation tracking screen according to the disclosed technologies.

An action associated with the first graphical representations 214 (*s*) defines the fourth stage (Verify Policy Information). An action associated with the first graphical representations 214 (*t*) reads, from the database 112, the policy information associated with the people now identified as covered by the policy (Dad, Mom, Grandma). An action associated with the first graphical representations 214 (*u*) presents the fifth operation tracking screen. FIG. 8 is a diagram illustrating an example of the fourth operation tracking screen 800 according to the disclosed technologies. The fifth operation tracking screen 800 can include the third screen area 302 and the fourth screen area 304. The third screen area 302 can have the second graphical control elements 306 configured to receive the information associated with the actions associated with the first sequence of operations. The graphical control elements 306 can include, for example, a collection of radio buttons. The information associated with the actions associated with the first sequence of operations (Is the following information correct?) can be received (for Dad, Mom, and Grandma) by the second graphical control elements 306 (the collection of radio buttons). The fourth screen area 304 can have the graphical representation 308 of the stages of the first sequence of operations that includes the graphical representation 602 of the second stage (Remove Person from Policy) and the graphical representation 604 of the third stage (Add New Person to Policy). In a configuration, a portion of the graphical representation 308 associated with the fourth stage (Verify Policy Information) can be highlighted.

FIG. 9 is a flow diagram illustrating an example of a method 900 for producing an application to process a sequence of operations according to the disclosed technologies. In the method 900, at an operation 902, a first signal to initiate a production of the first application to process the first sequence of operations can be received by a processor.

At an operation 904, in response to a receipt of the first signal, the processor can cause an operation tracking design screen to be presented on a first display. The operation tracking design screen can include a first screen area and a second screen area. The first screen area can be a canvas graphical user interface. The second screen area can include a population of first graphical control elements configured to cause, in response to being selected, first graphical representations to appear in the first screen area.

At an operation 906, second signals can be received by the processor. The second signals can indicate selections, from the population, of a set of first graphical control elements. The set of first graphical control elements can be associated with actions associated with the first sequence of operations. The second signals can also indicate directions, with respect to a set of first graphical representations, among the actions associated with the first sequence of operations.

In a particular configuration, the second signals can include first second signals and second signals. The first second signals can indicate the selections of the set of first graphical control elements. The second signals can indicate the directions, with respect to the set of first graphical representations, among the actions associated with the first sequence of operations.

At an operation 908, in response to receipts of the second signals, the processor can cause a first set of operation tracking screens to be produced. At least some of the operation tracking screens can include third screen areas and fourth screen areas. At least some of the third screen areas can have second graphic control elements configured to receive information associated with the actions associated with the first sequence of operations. The actions can include a first action performed concurrently with a second action. The fourth screen areas can have a graphical representation of stages of the first sequence of operations. The graphical representation of the stages can be of a default sequence of the stages in response to an initiation of the first application to process the first sequence of operations. The graphical representation of the stages can be modified to include a graphical representation of an additional stage in response to a determination of a result of a specific condition being a specific value.

In the particular configuration described above, the processor can cause the first set of operation tracking screens to be produced by: (1) causing, in response to receipts of the first second signals, a set of the first graphical representations, associated with the set of first graphical control elements, to appear in the first screen area and (2) causing, in response to receipts of the second signals, a set of second graphical representations to appear in the first screen area, wherein the set of second graphical representations indicate the directions, with respect to the set of first graphical representations, among the actions associated with the first sequence of operations.

FIG. 10 is a flow diagram illustrating an example of a method 1000 for causing the set of second graphical representations to appear in the first screen area according to the disclosed technologies. In the method 1000, at an operation 1002, a graphical representation, of the set of second graphical representations, can be caused to appear in the first screen area at a location of a first graphical representation of the set of first graphical representations. At an operation 1004, a pointing device gesture can be caused to occur to move the graphical representation to appear in the first screen area at a location of a second graphical representation of the set of first graphical representations.

Returning to FIG. 9, in a configuration, the actions associated with the first sequence of operations can further include: (1) third actions that can cause the stages of the first sequence of operations to be defined, (2) fourth actions that can cause the operation tracking screens to be presented on a second display, and (3) a fifth action that can be determining the result of the specific condition.

In a configuration, the second display can be the first display.

In a configuration, the second signals can: (1) indicate first selections of a first type of the first graphical control elements in which the first type can be associated with an action to change a value of a specific variable and the specific variable can be referenceable by another action, (2) select the specific variable to be a stage in which the stage can be of the first sequence of operations, (3) set the value to be a name of the stage, (4) indicate second selections of a second type of the first graphical control elements in which the second type can be associated with an action to present an operation tracking screen, and (5) indicate a third selection of a third type of the first graphical control elements, the third type being associated with an action to determine a result of a condition, and (6) set the condition to be the specific condition.

In a configuration, the set of first graphical control elements can include a type of the first graphical control elements associated with an action to change a value of a specific variable. The specific variable can be referenceable by another action. In a variation, the second screen area can include a tab interface. A first tab of the tab interface can include the population of first graphical control elements. A second tab of the tab interface can include a set of variables. The variables can be referenceable by other actions. The second signals can select, from the set of variables, the specific variable. The second signals can set the value of the specific variable.

In a configuration, the set of first graphical control elements can include a type of the first graphical control elements associated with an action to initiate a second application to process a second sequence of operations. The second sequence of operations can be associated with a second set of operation tracking screens. Actions associated with the second sequence of operations can include an action to interface with the database.

In a configuration, the actions associated with the first sequence of operations can further include one or more of: (1) an action causing a value to be read from the database, (2) an action causing a value to be written to the database, (3) an action causing a record to be created in the database, (4) an action causing a record to be deleted from the database, (5) an action determining a result of a condition, (6) an action causing one or more specific actions to be performed, in an iterative manner, on each item in a set of items, or (7) an action causing processing of at least a portion of the first sequence of operations to pause until a specific event occurs. In a variation, the set of first graphical control elements can include one or more of: (1) a type of the first graphical control elements associated with the action causing the value to be read from the database, (2) a type of the first graphical control elements associated with the action causing the value to be written to the database, (3) a type of the first graphical control elements associated with the action causing the record to be created in the database, (4) a type of the first graphical control elements associated with the action causing the record to be deleted from the database, (5) a type of the first graphical control elements associated with the action determining the result of the condition, (6) a type of first graphical control elements associated with the action causing the at least one specific action to be performed, in the iterative manner, on the each item in the set of items, or (7) a type of the first graphical control elements associated with the action causing processing of the at least the portion of the first sequence of operations to pause until the specific event occurs.

FIG. 11 is a flow diagram illustrating an example of a method 1100 for processing a sequence of operations according to the disclosed technologies. In the method 1100, at an operation 1102, a first signal to initiate an application to process the sequence of operations can be received by a processor.

At an operation 1104, in response to a receipt of the first signal, the processor can cause operation tracking screens to be presented on a display. At least some of the operation tracking screens can include first screen areas and second screen areas. At least some of the first screen areas can have graphical control elements configured to receive information associated with actions associated with the sequence of operations. The actions can include a first action performed concurrently with a second action. The graphical control elements can include one or more of a button, a radio button, a check box, a split button, a cycle button, a slider, a list box, a spinner, a drop-down list, a menu, a context menu, a pie menu, a menu bar, a tool bar, a ribbon, a combo box, a text box, or the like. The second screen areas can have a graphical representation of stages of the sequence of operations. The graphical representation of the stages can be of a default sequence of the stages in response to an initiation of the application to process the sequence of operations. The graphical representation of the stages can be modified to include a graphical representation of an additional stage in response to a determination of a result of a condition being a specific value.

At an operation 1106, second signals associated with the information associated with the actions associated with the sequence of operations can be received by the processor. In a particular configuration, the second signals associated with the information associated with the actions can be receiving one or more of the second signals associated with the information as a free-form text.

At an operation 1108, in response to receipts of the second signals, the processor can cause the sequence of operations to be processed. In the particular configuration described above, the processor can cause the sequence of operations to be processed can include producing, through a word embedding process, a vector that represents one or more words of the free-form text. Alternatively or additionally, another artificial intelligence technique can be used to convert the free-form text into information that can be processed in the sequence of operations.

Various implementations for producing an application to process a sequence of operations and for processing the sequence of operations can include or be implemented in the form of computer-implemented processes and apparatuses for practicing those processes. Implementations also can be implemented in the form of a computer program product having computer program code containing instructions implemented in non-transitory and/or tangible media, such as floppy diskettes, compact disc read-only memories (CD-ROMs), hard drives, universal serial bus (USB) drives, or any other machine readable storage medium, wherein, when the computer program code is loaded into and executed by a computer, the computer becomes an apparatus for practicing implementations for producing an application to process a sequence of operations and for processing the sequence of operations.

Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations for producing an application to process a sequence of operations and for processing the sequence of operations.

When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions.

Implementations can be implemented using hardware that can include a processor, such as a general-purpose microprocessor and/or an application-specific integrated circuit (ASIC) that implements all or part of the techniques according to implementations of the disclosed subject matter in hardware and/or firmware. The processor can be coupled to memory, such as random-access memory (RAM), read-only memory (ROM), flash memory, a hard disk or any other device capable of storing electronic information. The memory can store instructions adapted to be executed by the processor to perform the techniques for producing an application to process a sequence of operations and for processing the sequence of operations.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, thereby to enable others skilled in the art to utilize those implementations as well as various implementations with various modifications as may be suited to the particular use contemplated.

The invention claimed is:

1. A method for processing a sequence of operations, the method comprising:
   receiving, by a processor, a first signal to initiate an application to process the sequence of operations;
   causing, by the processor in response to receiving the first signal, an operation tracking screen to be presented on a display,
   wherein at least some of the operation tracking screen includes a first screen area and a second screen area,
   wherein the first screen area has graphical control elements configured to receive information associated with actions corresponding to the sequence of operations, the actions including a first action configured to be performed concurrently with a second action, and
   wherein the second screen area has a graphical representation of stages of the sequence of operations,
   the graphical representation of the stages being of a default sequence of the stages in response to an initiation of the application to process the sequence of operations, and
   the graphical representation of the stages being modified to include a graphical representation of an additional stage in response to a determination of a result of a condition being a specific value based on received information in a graphical control element of the first screen area;
   receiving, by the processor, second signals associated with the first and second actions corresponding to the sequence of operations; and
   causing, by the processor in response to receipts of the second signals, the sequence of operations to be processed.

2. The method of claim 1, wherein the graphical control elements include at least one of a button, a radio button, a check box, a split button, a cycle button, a slider, a list box, a spinner, a drop-down list, a menu, a context menu, a pie menu, a menu bar, a tool bar, a ribbon, a combo box, or a text box.

3. The method of claim 1, wherein:
   the receiving the second signals associated with the information comprises receiving at least one of the second signals associated with the information as a free-form text; and
   the causing the sequence of operations to be processed includes producing, through a word embedding process, a vector that represents at least one word of the free-form text.

4. A non-transitory computer-readable medium storing computer code for controlling a processor to cause the processor to process a sequence of operations, the computer code including instructions to cause the processor to:
   receive a first signal to initiate an application to process the sequence of operations;
   cause, in response to the first signal, an operation tracking screen to be presented on a display,
   wherein at least some of the operation tracking screen include a first screen area and a second screen area,
   wherein the first screen area has graphical control elements configured to receive information associated with actions corresponding to the sequence of operations, the actions including a first action configured to be performed concurrently with a second action, and
   wherein the second screen area has a graphical representation of stages of the sequence of operations,
   the graphical representation of the stages being of a default sequence of the stages in response to an initiation of the application to process the sequence of operations, and
   the graphical representation of the stages being modified to include a graphical representation of an additional stage in response to a determination of a result of a condition being a specific value based on received information in a graphical control element of the first screen area;
   receive second signals associated with the first and second actions corresponding to the sequence of operations; and
   cause, in response to the second signals, the sequence of operations to be processed.

5. A system for processing a sequence of operations, the system comprising:
   a database; and
   a processor configured to:
      receive a first signal to initiate an application to process the sequence of operations;
      causing, in response to the first signal, an operation tracking screen to be presented on a display,
      wherein the operation tracking screen includes a first screen area and a second screen area,
      wherein the first screen area has graphical control elements configured to receive information associated with actions associated with the sequence of operations, the actions including a first action configured to be performed concurrently with a second action, and
      wherein the second screen area has a graphical representation of stages of the sequence of operations,
      the graphical representation of the stages being of a default sequence of the stages in response to an initiation of the application to process the sequence of operations, and
      the graphical representation of the stages being modified to include a graphical representation of an additional stage in response to a determination of a result of a condition being a specific value based on receiving information in a graphical control element of the first screen area;

receive second signals associated with the first and second actions corresponding to the sequence of operations; and cause, in response to the second signals, the sequence of operations to be processed.

6. A method for producing a first application to process a first sequence of operations, the method comprising:

receiving, by a processor, a first signal to initiate a production of the first application to process the first sequence of operations;

causing, by the processor in response to receiving the first signal, an operation tracking design screen to be presented on a first display,
wherein the operation tracking design screen includes a first screen area and a second screen area,
wherein the first screen area is a canvas graphical user interface, and
wherein the second screen area includes a population of first graphical control elements configured to cause, in response to being selected, first graphical representations to appear in the first screen area;

receiving, by the processor, second signals that indicate:
selections, from the population of first graphical control elements, of a set of first graphical control elements, the set of first graphical control elements being associated with actions corresponding to the first sequence of operations, and
directions, with respect to a set of first graphical representations, among the actions corresponding to the first sequence of operations; and causing, by the processor in response to receiving the second signals, a first set of operation tracking screens to be produced,
wherein at least some of the first set of operation tracking screens include third screen areas and fourth screen areas,
wherein the third screen areas have second graphic control elements configured to receive information associated with the actions corresponding to the first sequence of operations, the actions including a first action configured to be performed concurrently with a second action, and
wherein the fourth screen areas have a graphical representation of stages of the first sequence of operations, the graphical representation of the stages being of a default sequence of the stages in response to an initiation of the first application to process the first sequence of operations, and
the graphical representation of the stages being modified to include a graphical representation of an additional stage in response to a determination of a result of a specific condition being a specific value based on receiving information in a second graphical control element of the third screen area.

7. The method of claim 6, wherein:
the second signals include first second signals and second signals,
the first second signals indicate the selections of the set of first graphical control elements,
the second signals indicate the directions, with respect to the set of first graphical representations, among the actions associated with the first sequence of operations, and the causing the operation tracking screens to be produced comprises:
causing, by the processor in response to receipts of the first second signals, a set of the first graphical representations, associated with the set of first graphical control elements, to appear in the first screen area, and
causing, by the processor in response to receipts of the second signals, a set of second graphical representations to appear in the first screen area, wherein the set of second graphical representations indicate the directions, with respect to the set of first graphical representations, among the actions associated with the first sequence of operations.

8. The method of claim 7, wherein the causing the set of second graphical representations to appear in the first screen area comprises:
causing a graphical representation, of the set of second graphical representations, to appear in the first screen area at a location of a first graphical representation of the set of first graphical representations; and
causing a pointing device gesture to occur to move the graphical representation to appear in the first screen area at a location of a second graphical representation of the set of first graphical representations.

9. The method of claim 7, wherein the actions associated with the first sequence of operations further include:
third actions causing the stages of the first sequence of operations to be defined;
fourth actions causing the operation tracking screens to be presented on a second display; and
a fifth action being determining the result of the specific condition.

10. The method of claim 9, wherein the second display is the first display.

11. The method of claim 6, wherein the second signals:
indicate first selections of a first type of the first graphical control elements, the first type being associated with an action to change a value of a specific variable, the specific variable referenceable by another action,
select the specific variable to be a stage, the stage being of the first sequence of operations,
set the value to be a name of the stage,
indicate second selections of a second type of the first graphical control elements, the second type being associated with an action to present an operation tracking screen,
indicate a third selection of a third type of the first graphical control elements, the third type being associated with an action to determine a result of a condition, and
set the condition to be the specific condition.

12. The method of claim 6, wherein the set of first graphical control elements includes a type of the first graphical control elements associated with an action to change a value of a specific variable, the specific variable referenceable by another action.

13. The method of claim 12, wherein:
the second screen area includes a tab interface, a first tab of the tab interface including the population of first graphical control elements, a second tab of the tab interface including a set of variables, the variables referenceable by other actions,
the second signals select, from the set of variables, the specific variable, and
the second signals set the value of the specific variable.

14. The method of claim 6, wherein the set of first graphical control elements includes a type of the first graphical control elements associated with an action to initiate a second application to process a second sequence of operations.

15. The method of claim 14, wherein the second sequence of operations is associated with a second set of operation tracking screens.

16. The method of claim 14, wherein actions associated with the second sequence of operations include an action to interface with the database.

17. The method of claim 6, wherein the actions associated with the first sequence of operations further include at least one of:
   an action causing a value to be read from the database,
   an action causing a value to be written to the database,
   an action causing a record to be created in the database,
   an action causing a record to be deleted from the database,
   an action determining a result of a condition,
   an action causing at least one specific action to be performed, in an iterative manner, on each item in a set of items, or
   an action causing processing of at least a portion of the first sequence of operations to pause until a specific event occurs.

18. The method of claim 17, wherein the set of first graphical control elements includes at least one of:
   a type of the first graphical control elements associated with the action causing the value to be read from the database,
   a type of the first graphical control elements associated with the action causing the value to be written to the database,
   a type of the first graphical control elements associated with the action causing the record to be created in the database,
   a type of the first graphical control elements associated with the action causing the record to be deleted from the database,
   a type of the first graphical control elements associated with the action determining the result of the condition,
   a type of first graphical control elements associated with the action causing the at least one specific action to be performed, in the iterative manner, on each item in the set of items, or
   a type of the first graphical control elements associated with the action causing processing of the at least the portion of the first sequence of operations to pause until the specific event occurs.

19. A non-transitory computer-readable medium storing computer code for controlling a processor to cause the processor to produce an application to process a sequence of operations, the computer code including instructions to cause the processor to:
   receive a first signal to initiate a production of the application to process the sequence of operations;
   cause, in response to receiving the first signal, an operation tracking design screen to be presented on a first display,
      wherein the operation tracking design screen includes a first screen area and a second screen area,
      wherein the first screen area is a canvas graphical user interface, and
      wherein the second screen area includes a population of first graphical control elements configured to cause, in response to being selected, first graphical representations to appear in the first screen area;
   receive second signals that indicate:
      selections, from the population of first graphical control elements, of a set of first graphical control elements, the set of first graphical control elements being associated with actions corresponding to the sequence of operations, and
      directions, with respect to a set of first graphical representations, among the actions corresponding to the sequence of operations; and
   cause, in response to receiving the second signals, a set of operation tracking screens to be produced,
      wherein at least some of the operation tracking screens include third screen areas and fourth screen areas,
      wherein at least some of the third screen areas have second graphic control elements configured to receive information associated with the actions corresponding to the sequence of operations, the actions including a first action configured to be performed concurrently with a second action, and
      wherein the fourth screen areas have a graphical representation of stages of the sequence of operations, the graphical representation of the stages being of a default sequence of the stages in response to an initiation of the application to process the sequence of operations, and
   the graphical representation of the stages being modified to include a graphical representation of an additional stage in response to a determination of a result of a specific condition being a specific value based on receiving information in a second graphical control element of the third screen area.

20. A system for producing an application to process a sequence of operations, the system comprising:
   a database; and
   a processor configured to:
      receive a first signal to initiate a production of the application to process the sequence of operations;
      cause, in response to receiving the first signal, an operation tracking design screen to be presented on a first display,
         wherein the operation tracking design screen includes a first screen area and a second screen area,
         wherein the first screen area is a canvas graphical user interface, and
         wherein the second screen area includes a population of first graphical control elements configured to cause, in response to being selected, first graphical representations to appear in the first screen area;
      receive second signals that indicate:
         selections, from the population of first graphical control elements, of a set of first graphical control elements, the set of first graphical control elements being associated with actions corresponding to the sequence of operations, and
         directions, with respect to a set of first graphical representations, among the actions corresponding to the sequence of operations; and
      cause, in response to receiving the second signals, a set of operation tracking screens to be produced,
         wherein at least some of the set of operation tracking screens include third screen areas and fourth screen areas,
         wherein the third screen areas have second graphic control elements configured to receive information associated with the actions corresponding to the sequence of operations, the actions including a first action configured to be performed concurrently with a second action, and wherein the fourth screen areas have a graphical representation of stages of the sequence of operations, the graphical representation of the stages being of a default sequence of the stages in response to an initiation of the application to process the sequence of operations, and the graphical representation of the stages being modified to include a graphical representation of an additional stage in response to a determination of a result of a specific condition being a specific value based on receiving information in a second graphical control element of the third screen area.

* * * * *